UNITED STATES PATENT OFFICE 2,545,572

PRODUCTION OF STREPTOMYCIN WITH A NEW ACTINOMYCES GRISEUS MUTANT

Eugene L. Dulaney, Rahway, N. J., assignor to Merck & Co., Inc., Rahway, N. J., a corporation of New Jersey No Drawing. Application February 14, 1948, Serial No. 8,308

1 Claim. (Cl. 195—80)

This invention relates to the development of new improved strains of the microorganism *Actinomyces griseus* by the mutating action of ultraviolet light and nitrogen mustard on strains of *A. griseus* which are resistant to high initial concentrations of streptomycin in culture mediums and to the utilization of such improved strains in the production of streptomycin by fermentation procedures. More particularly the invention relates to the development of new strains of *A. griseus* which consistently produce, under submerged aerated conditions, yields of streptomycin in excess of 800 mcg./ml., including a preferred new strain designated as *A. griseus* Dulaney L–118, and to the propagation of such new strains under submerged aerated conditions for the production of streptomycin.

In a co-pending application of my colleagues, McDaniel and Hodges, Serial No. 8,306, filed February 14, 1948, a process has been disclosed for developing strains of *A. griseus* (there referred to as *Streptomyces griseus* or *S. griseus*) which are highly resistant to streptomycin, i. e. which grow well in the media containing high initial concentrations of streptomycin. Thus McDaniel and Hodges have disclosed that by propagating strains of *A. griseus* in a medium containing an initial streptomycin concentration which materially inhibits growth of the organism, and transferring mycelium which develops under such conditions to mediums containing successively higher initial amounts of streptomycin, strains of *A. griseus* can be obtained which grow well in mediums containing 500–600 or more mcg./ml. of streptomycin. While the strains thus developed show some increase in streptomycin yield when propagated in a suitable nutrient medium, under submerged aerated conditions, the increase in yield is not of the same order as the increase in streptomycin resistance, thus suggesting that streptomycin yield and resistance to streptomycin are dependent upon different physiological functions of the organism.

In another co-pending application of my colleague Arabelle B. Hodges, Serial No. 780,755, filed October 18, 1947, now abandoned, a process has been disclosed for subjecting strains of *A. griseus* to ultraviolet irradiation to produce mutated strains of *A. griseus* capable of producing somewhat higher yields of streptomycin. Increases in streptomycin production of the order of 50% are disclosed in said application.

I have now discovered that strains of *A. griseus* which have been developed to a point of high streptomycin resistance tend to retain this resistance when subjected to the mutating action of ultraviolet light or nitrogen mustard. It has further been discovered that, by subjecting to the action of ultraviolet light or nitrogen mustard a strain of *A. griseus* which is resistant to at least 500 mcg./ml. of streptomycin, a relatively high incidence of mutation to higher yielding strains of *A. griseus* is achieved. By selecting the best of the higher yielding strains thus formed and repeating the procedures of treating with ultraviolet light or nitrogen mustard and selecting improved strains, I have developed a number of mutants which will produce 2 to 3 times as much streptomycin as the parent strain under the same conditions of propagation. The enhanced yield of these mutants is even more pronounced when the conditions of propagation, as for example the medium composition, are altered or adjusted to the optimum conditions for propagation of the mutant.

In the production of mutated strains of *A. griseus* by the action of ultraviolet light in accordance with the present invention a sterile spore suspension of the starting strain, either in a flask or flat dish, is exposed to ultraviolet light of a high killing wave length, as for example about 2,537 Å., for a time interval sufficient to kill 99% or more of the spores. The time required is generally several minutes but varies considerably depending on the distance from the light source to the spore suspension. The suspension of surviving spores is then diluted and plated out on nutrient agar such as yeast extract-dextrose agar (i. e. 1% yeast extract, 0.5% dextrose, 2.0% agar). Actinomycete colonies that develop on the agar are transferred to slants of the same medium and allowed to sporulate. Spores from these cultures are used to inoculate a fermentation medium. A suitable medium for this purpose is a medium of the following composition: soybean meal—20.0 gm., dextrose—10.0 gm., sodium chloride—10.0 gm., and distilled water—1 liter, preferably adjusted to pH 7.0 to 7.2 with 1 N sodium hydroxide before sterilization. It will be understood, however, that mediums of widely varying composition can be employed. After inoculation, the medium is incubated at about 28° C. under submerged aerated conditions for a period of about 3 to 4 days, and then assayed for streptomycin content.

The yields obtained by the propagation of various cultures developed from the spores surviving ultraviolet radiation vary between wide limits, but a fair proportion of the cultures shows yields of streptomycin markedly greater than the yields produced by the parent streptomycin resistant strain of *A. griseus*. The best of the new cultures or mutated strains are selected and developed as stock cultures to use for further treatment with ultraviolet light or with nitrogen mustard.

It will be evident that this procedure of plating out spores which survive ultraviolet light and selection and development of new strains involves the handling of considerable numbers of individual cultures and also involves a large element of chance in the selection of strains to be developed. While occasionally a single ultraviolet treatment and colony selection produce a mutant of *A. griseus* which will produce as much as twice the amount of streptomycin as the parent strain, the maximum increase generally achieved in a single ultraviolet treatment is about 40 to 50%. When the higher yielding mutants selected as the best strains resulting from a single treatment are subjected to additional treatments with ultraviolet light, and surviving spores developed into new cultures as above described, further yield increases of 40 to 50% and occasionally higher increments are obtained. While it may not be possible to continue indefinitely increasing the yield of *A. griseus* in mutated strains, the mutants can readily be obtained by following the above procedure which produce as much as 2 to 3 times the amount of streptomycin as the starting streptomycin resistant strain.

The mutation of *A. griseus* by the action of nitrogen mustard and production of high yielding mutants is conducted in accordance with the procedure described when using ultra-violet light except that the initial spore suspension is prepared in a phosphate buffer at about pH 8.0 with $(ClCH_2CH_2)_3N$ at a 0.005 M concentration. At this concentration approximately 99% of the spores are killed in about 30 minutes and the spore suspension is then diluted with 1% glycine and plated out as above described. It will be understood that, in addition to using ultraviolet light and nitrogen mustard separately in procedures for producing high yielding strains of *A. griseus*, the two can be used alternately or intermittently in the step-wise development of high yielding mutants of *A. griseus*.

The following example is illustrative of procedures used in obtaining high yielding mutants of *A. griseus*.

EXAMPLE I

A starting strain, A, of *A. griseus* was selected which had been developed from Waksman strain #4 to a point of resistance to at least 500 mcg./ml. of streptomycin by the McDaniel procedure, and which produced 250 mcg./ml. of streptomycin, under submerged aerated conditions, in a medium having the composition:

Soy bean meal_____grams__ 20.0
Dextrose _____do____ 10.0
Sodium chloride_____do____ 10.0
Distilled water _____liters__ 1

Spores from this strain were suspended in water and exposed to ultraviolet light of a wave length of 2,537 Å. at a distance of 10 inches for 12 minutes in which time approximately 99% of the spores were killed. The surviving spores were then plated out on yeast extract-dextrose agar and individual actinomycete colonies which developed were transferred to agar slants of the same composition and allowed to sporulate. The developed spores were then used to inoculate flasks containing a nutrient medium of the following composition:

Soy bean meal_____grams__ 20.0
Dextrose _____do____ 10.0
Sodium chloride_____do____ 10.0
Distilled water _____liters__ 1 and the inoculated mediums were incubated at 28° C., under submerged aerated conditions, for 3 to 5 days and then assayed for streptomycin content. Several of these samples showed a streptomycin yield considerably higher than the 250 mcg./ml. of the starting strain. One strain, B, was selected for further development, however, which showed a yield of 400 mcg./ml. A quantity of spores of strain B were suspended in a phosphate buffer solution at pH 8.0 containing $(ClCH_2CH_2)_3N$ in an 0.005 N concentration for 30 minutes. The surviving spores were then transferred to nutrient agar as above described, actinomycete colonies which developed were transferred to agar slants for sporulation and spores thus developed used for inoculation of flasks of nutrient medium having a composition of:

Soy bean meal_____grams__ 20.0
Dextrose _____do____ 10.0
Sodium chloride_____do____ 10.0
Distilled water _____liters__ 1

Incubation of the inoculated flasks for 3 to 5 days at 28° C., under submerged aerated conditions, and assay for streptomycin content revealed a mutated strain, C, which produced 500 mcg./ml. and a strain, D, which produced 550 mcg./ml. Although the formation of strains C and D showed a decided mutation of the organism in the desired direction, adverse changes in the organism had, apparently, also taken place as the ability of these strains to produce high yields of streptomycin diminished over a period of time.

Strain B was then plated out and individual colonies selected. One of these selected colonies, which showed higher streptomycin producing capacity than did the original strain B culture, was designated as strain E and consistently yielded 550 mcg./ml. of streptomycin. The strain E was again treated in the same way with ultra-violet light and from approximately 150 isolates which were propagated and assayed three strains were obtained which produce consistently 800 mcg./ml. of streptomycin when propagated under submerged aerated conditions in a medium having the composition:

Soy bean meal _____grams__ 20.0
Dextrose _____do____ 10.0
Sodium chloride _____do____ 10.0
Distillers dried solubles_____do____ 2.5
Distilled water _____liters__ 1

The over-all increase from strain A producing 250 mcg./ml. to those capable of producing 800 mcg./ml. was accomplished after some 3,000 isolates had been tested. The highest yielding strain thus obtained has been designated *A. griseus* Dulaney L–118.

The cultural characteristics of the new strain, *A. griseus* Dulaney L–118, are listed in the following tabulations and compared with the listings given for *A. griseus* in the 5th edition of Bergey's Manual of Determinative Bacteriology and with the cultural characteristics of the Waksman #4 strain of *A. griseus*.

Table I
Cultural characteristics of A. griseus

| | A. griseus | A. griseus Waksman #4 | A. griseus Dulaney L-118 |
|---|---|---|---|
| Filaments Conidia | Branching, a few spirals rod-shaped to short cylindrical 0.8 x 0.8 to 1.7 microns. | Branching—Agrees. | Branching—Agrees. |
| Gelatin stab | Greenish-yellow or cream-colored surface growth, brownish tinge-rapid liquefaction. | Grey surface growth. Rapid liquefaction. | Heavy grey surface growth. Rapid liquefaction. |
| Synthetic agar | Thin, colorless, spreading, olive buff—aerial mycelium thick, powder, water-green. | Agrees-agrees, except greenish-grey color. | Agrees-agrees, except greenish-grey color. |
| Starch agar | Thin spreading, transparent | Thin-transparent | Thin-transparent. |
| Dextrose agar | Elevated in center, radiate cream-colored to orange, erose margin. | Punctiform-cream colored colonies-later coalesced and wrinkled. | Punctiform-cream colored colonies—later coalesced and wrinkled. |
| Plain agar | Abundant, cream-colored, almost transparent. | Abundant, white, turning grey. | Abundant, white, turning grey. |
| Dextrose broth | Abundant, yellowish pellicle with greenish tinge, much folded. | Agrees | Agrees. |
| Litmus milk | Cream-colored ring, coagulated with rapid peptonization, becoming alkaline. | Peptonization Alkaline | Peptonization Alkaline. |
| Potato | Yellowish, wrinkled | Very heavy grey growth | Very heavy grey growth. |
| Reduction | Nitrites not produced from nitrates | Slight reduction | Very slight reduction. |
| Proteolytic action | Proteolytic activity in milk and gelatin. | Agrees | Agrees. |
| Pigment | Not soluble | do | Do. |
| Starch | Hydrolyzed | do | Hydrolyzed. |
| Oxygen tension | Aerobic | do | Agrees. |
| Sugar utilization | Not listed | See Table II | See Table II. |
| Susceptibility to actinophage for A. griseus, Waksman strains. | do | Susceptible | Susceptible. |
| Production of streptomycin | Not listed (type culture does not produce streptomycin). | 400 mcg./ml. soy bean meal medium. | 800-1600 mcg./ml. soy bean meal medium. |
| Resistance to streptomycin | Not listed | See Table III | See Table III. |

Table II
Sugar utilization by A. griseus [1]

| Sugars | A. griseus Waksman #4 | A. griseus Dulaney L-118 |
|---|---|---|
| glucose | + | + |
| levulose | + | + |
| arabinose | + | + |
| xylose | + | + |
| mannose | + | + |
| galactose | + | + |
| rhamnose | — | — |
| sorbose | — | — |
| sucrose | + | + |
| lactose | + | + |
| cellobiose | + | + |
| maltose | + | + |
| raffinose | — | — |
| inulin | — | — |
| dextrin | + | + |
| salicin | — | — |

[1] 0.5% sugar in nutrient broth base. Listed as + if 25% or more of sugar was utilized in 3 days submerged growth. Confirmed in $(NH_4)_2HPO_4$ synthetic medium where no growth occurred in any medium with a sugar listed as —, with the exception of arabinose which also did not support growth.

Table III
Resistance of A. griseus to streptomycin ([1])

| Micrograms streptomycin per ml. Agar | Growth on streak | |
|---|---|---|
| | A. griseus Waksman #4 | A. griseus Dulaney L-118 |
| 0 | 4+ | 4+ |
| | 4+ | 4+ |
| 200 | 0 | 1+ |
| | 0 | 1+ |
| 400 | 0 | 1+ |
| | 0 | 1+ |
| 600 | 0 | 2+ |
| | 0 | 0 |
| 800 | 0 | Trace |
| | 0 | 0 |
| 1600 | 0 | 0 |
| | 0 | 0 |

[1] Agar streak method, spore inoculum.

The foregoing tabulations clearly indicate that the new strain, A. griseus Dulaney L-118, is definitely characterized as being a strain of A. griseus and is further characterized as a different and distinct strain by virtue of its high production of streptomycin and high resistance to streptomycin.

Even higher yields of streptomycin can be obtained by propagation of A. griseus Dulaney L-118 and other high yielding strains in mediums which particularly favor the growth and streptomycin elaboration of these strains. This is clearly illustrated in the following example.

EXAMPLE II

Fermentation mediums were prepared having the following composition:

| Component | Medium A | Medium B |
|---|---|---|
| | Per cent | Per cent |
| Soybean meal | 2 | 2.5 |
| Dextrose | 1 | 1.5 |
| Distillers dried solubles | 0.5 | 0.75 |
| NaCl | 0.25 | 0.25 |
| Water to 100% | | |

Flasks containing these mediums were inoculated with a vegetative growth of A. griseus Dulaney L-118 obtained in Example I and the inoculated mediums were incubated at 28° C. under submerged aerated conditions for 3 to 5 days. At this time assays showed the fermented mediums or broths to contain 900-950 mcg./ml. of streptomycin in the case of medium A and approximately 1100 mcg./ml. in the case of medium B.

Yields of a comparable order have been obtained by submerged aerated fermentation, using the same mediums and conducted on a pilot plant scale in fermenters of 1500 gallon capacity, and on a plant scale in fermenters of 15,000 gallon capacity.

While the mediums employed in Example II were inoculated with a vegetative growth of A. griseus Dulaney L-118, it is to be understood that similar results are obtained using as an inoculum a spore suspension of A. griseus Dulaney L-118.

While the foregoing description and examples are illustrative of preferred embodiments of my invention, it will be noted that various changes and modifications can be made without departing from the spirit and scope of the invention and I am to be limited only by the appended claim.

I claim:

The process for the production of streptomycin that comprises fermenting an aqueous nutrient medium under submerged aerated conditions by means of the organism *Actinomyces griseus* Dulaney L-118, an artificially produced mutant characterized as resistant to an initial streptomycin concentration of at least 500 mcg./ml., and further characterized as consistently yielding at least 300 mcg./ml. of streptomycin.

EUGENE L. DULANEY.

REFERENCES CITED

The following references are of record in the file of this patent:

UNITED STATES PATENTS

| Number | Name | Date |
|---|---|---|
| 2,437,918 | McCormack | Mar. 16, 1948 |
| 2,445,748 | Demerec | July 27, 1948 |
| 2,461,922 | Rake | Feb. 15, 1949 |

OTHER REFERENCES

Schatz et al., Proc. Soc. Exptl. Biol. and Med., Jan. 1944, pages 66 to 69.

LePage et al., Jour. Biol. Chem., 162, 1, Jan. 1946, pages 163–171.

McMahon, Jour. Bact., #47, Apr. 1944, pages 400–401.

Science News Letter, Jan. 13, 1945, page 30.

Biol. Abstracts, 19 (1945), Abstract 13620, page 1482.

Wickerham, Arch. of Biochem., 9, 1, Jan. 1946, page 96.

Chemical Abstracts 41: 5579 (*g*).